(12) United States Patent
Kaiser et al.

(10) Patent No.: US 9,956,821 B2
(45) Date of Patent: May 1, 2018

(54) WHEEL BEARING UNIT

(71) Applicant: Schaeffler Technologies AG & Co. KG, Herzogenaurach (DE)

(72) Inventors: Andreas Kaiser, Werneck (DE); Florian Koniger, Schweinfurt (DE); Frank Eichelmann, Donnersdorf (DE); Ralf Heiss, Nuremberg (DE); Markus Reuter, Wurzburg (DE); Jonas Lang, Schwebheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/305,489

(22) PCT Filed: Mar. 10, 2015

(86) PCT No.: PCT/DE2015/200132
§ 371 (c)(1),
(2) Date: Oct. 20, 2016

(87) PCT Pub. No.: WO2015/169297
PCT Pub. Date: Nov. 12, 2015

(65) Prior Publication Data
US 2017/0043619 A1 Feb. 16, 2017

(30) Foreign Application Priority Data

May 6, 2014 (DE) ........................ 10 2014 208 422

(51) Int. Cl.
*F16C 33/78* (2006.01)
*F16C 41/00* (2006.01)
(Continued)

(52) U.S. Cl.
CPC ........ *B60B 27/0073* (2013.01); *B60B 7/0013* (2013.01); *B60B 27/0005* (2013.01);
(Continued)

(58) Field of Classification Search
CPC .... F16C 19/186; F16C 33/723; F16C 33/768; F16C 33/783; F16C 41/007;
(Continued)

(56) References Cited

U.S. PATENT DOCUMENTS 6,637,754 B1 10/2003 Ohtuski et al.
8,382,377 B2 * 2/2013 Yamamoto .......... B60B 27/0005
384/448

(Continued)

FOREIGN PATENT DOCUMENTS

DE 47076 A2 7/1966
DE 10056175 6/2001
(Continued)

*Primary Examiner* — Marcus Charles
(74) *Attorney, Agent, or Firm* — Volpe and Koenig, P.C.

(57) ABSTRACT

Wheel bearing unit with a wheel hub, wherein the wheel hub has an integrally formed wheel flange on one end thereof and an inner ring that is rotatable together with the wheel hub, wherein the inner ring is fastened on the wheel hub through the use of a rolling rivet connection in order to pre-tension a row of rolling elements in relation to an outer ring, and with an encoder provided on the inner ring and extending radially towards the outer ring, and with a protective cover fixed on the outer ring in order to close and seal annular openings formed between the outer ring and the wheel hub, and wherein a cylindrical section of the protective cover is pressed in and wherein a bottom section extends inwardly from the cylindrical section in a radial direction in order to cover an inner-side end of the wheel hub, wherein the cylindrical section is joined with a substance bond to the outer ring and wherein the substance-bond connection is produced through the use of a hardening fluid and wherein the fluid is held in a filling reservoir provided between the cylindrical section and the outer ring.

10 Claims, 5 Drawing Sheets

(51) Int. Cl.
  *F16C 19/18* (2006.01)
  *F16C 33/72* (2006.01)
  *G01P 3/42* (2006.01)
  *B60B 27/00* (2006.01)
  *B60B 7/00* (2006.01)
  *G01P 3/44* (2006.01)

(52) U.S. Cl.
  CPC ........ B60B 27/0068 (2013.01); F16C 19/186 (2013.01); F16C 33/723 (2013.01); F16C 33/783 (2013.01); F16C 41/007 (2013.01); G01P 3/443 (2013.01); *B60B 2900/211* (2013.01); *B60B 2900/321* (2013.01); *B60B 2900/511* (2013.01); *B60Y 2200/11* (2013.01); *F16C 2226/40* (2013.01); *F16C 2326/02* (2013.01)

(58) Field of Classification Search
  CPC ............. F16C 2326/02; F16C 2226/40; B60B 27/0007; B60B 27/0068; B60B 27/0013; B60B 27/0073; B60B 27/0084; B60B 2900/211; B60B 2900/321; B60B 2900/511; G01P 3/443; B60Y 2200/11
  USPC ........ 384/448, 477, 489, 544, 589; 324/174; 301/105.1, 111.03; 73/494
  See application file for complete search history.

(56) References Cited

U.S. PATENT DOCUMENTS

| | | | |
|---|---|---|---|
| 8,393,795 B2* | 3/2013 | Aritake | F16C 33/768 384/448 |
| 8,585,298 B2 | 11/2013 | Komori et al. | |
| 9,056,523 B2* | 6/2015 | Norimatsu | B60B 27/0068 |
| 2007/0268013 A1* | 11/2007 | Yamamoto | F16C 33/723 324/174 |
| 2010/0092117 A1 | 4/2010 | Ono et al. | |
| 2011/0254356 A1 | 10/2011 | Yamamoto et al. | |
| 2015/0063734 A1* | 3/2015 | Duch | F16C 33/7823 384/446 |

FOREIGN PATENT DOCUMENTS

| | | |
|---|---|---|
| DE | 112008001568 T5 | 8/2010 |
| DE | 112011100942 | 1/2013 |
| EP | 1693676 B1 | 5/2013 |
| EP | 2685117 | 1/2014 |
| WO | 2008006777 | 1/2008 |

* cited by examiner

WHEEL BEARING UNIT

CROSS REFERENCE TO RELATED APPLICATIONS

The present application claims priority to German Patent Application 10 2014 208 422.9, filed May 6, 2014, and PCT Application PCT/DE2015/200132, filed Mar. 10, 2015.

FIELD OF THE INVENTION

The invention relates to a wheel bearing unit, in particular, for motor vehicles.

BACKGROUND

Rolling riveted wheel bearing units have been used for passenger cars in the past in large numbers. Even for non-driven wheel bearing units, they are regularly used in connection with vehicle-side covers that can take over a large part of the axial-side sealing function. Even in connection with sensor-equipped wheel bearing units that can detect or measure, for example, wheel rotational speeds, these cover closures are advantageous. Through such cover closures it is no longer necessary at this point to provide another contacting or sliding seal. In order to sense an inner rotating encoder and to not influence its magnetic field, the cover with mounted sensors is made from a non-ferromagnetic material.

From DE 11 2011 100 942 T5, a wheel bearing unit with a cover is known in which the cover is pressed in with a section into the vehicle-side end of an outer ring. Between the outer ring and the cover there is an elastic element that is pressed in with the cover and is deformed elastically.

EP 2 047 131 B1 discloses a wheel bearing unit that provides a cover for sealing the bearing. The cover is formed with a section on an outer peripheral surface of an outer ring.

SUMMARY

The invention is based on the objective of providing a wheel bearing unit that guarantees a secure seal.

According to the invention, this object is achieved by a wheel bearing unit with a wheel hub, wherein the wheel hub has, on its one end, an integrally formed wheel flange and an inner ring that can rotate together with the wheel hub, wherein the inner ring is fastened by the use of a rolling rivet connection on the wheel hub, in order to pre-tension a row of roller elements relative to an outer ring, and with an encoder that is provided on the inner ring and extends radially in the direction of the outer ring and with a protective cover that is fixed on the outer ring to close and seal ring-shaped openings that are formed between the outer ring and the wheel hub, and wherein the protective cover is pressed in with a cylindrical section and wherein a bottom section extends inward from the cylindrical section in the radial direction, in order to cover an inner-side end of the wheel hub, wherein the cylindrical section is connected with a substance bond to the outer ring and wherein the substance bond connection is produced through the use of a hardening fluid and wherein the fluid is held in a fill reservoir that is provided between the cylindrical section and the outer ring.

For the wheel bearing unit according to the invention, for sealing the ring-shaped opening between the outer ring and wheel hub there is a protective cover. This protective cover is pressed in with a cylindrical section into the outer ring. After pressing in, the protective cover is connected to the outer ring with a substance bond. The substance bond connection is produced by means of a hardening fluid. This hardening fluid is injected into a fill reservoir provided for this purpose after the protective cover is pressed in. This fill reservoir is provided between the outer ring and the cylindrical section of the protective cover. The fluid hardens after it is applied, creating a fixed connection between the protective cover and outer ring. For hardening, preferably a UV light source can be provided. It is advantageous that, first, a captive connection between the protective cover and outer ring is created. Second, a sealing is created by the substance bond connection that allows a secure sealing of the wheel bearing unit. This means that the penetration of rainwater or dust from outside into the bearing is prevented.

Preferably the fill reservoir is formed on the outer ring by a gap. This gap can be provided all around or only in some sections in the radial direction. The gap can be formed by grooves, channels, undercuts, or recesses. Such a formation offers an additional positive-fit connection for the connected parts and acts here similar to a securing ring. Through the gap it is guaranteed that the UV light can penetrate for hardening the fluid.

In one construction of the invention, the fill reservoir is formed on the cylindrical section of the protective cover by a bead. Such a formation offers additional protection for the hardening fluid.

According to one construction of the invention, the protective cover is pressed in with the cylindrical section on an inner periphery of the outer ring. Alternatively, the protective cover is pressed in with the cylindrical section on an outer periphery of the outer ring. According to requirements or the existing installation space, the protective cover is pressed in on the inner periphery or on the outer periphery of the outer ring.

According to one construction of the invention, the protective cover is made from a non-ferromagnetic material. The protective cover can be made from a metallic material and also from a plastic. Therefore, negative effects on the magnetic flux can be prevented.

Preferably, the protective cover has a shell-shaped form and is formed by molding. Through such a formation of the protective cover, the rigidity can be increased and deformation due to impacts of gravel, etc. can be suppressed.

In one construction of the invention, a rotational speed sensor is provided for detecting the rotational speed of the wheel hub, wherein the rotational speed sensor and the encoder are arranged opposite each other with a predetermined air gap in the axial direction over the bottom section.

BRIEF DESCRIPTION OF THE DRAWINGS

An embodiment of the invention is shown below with reference to nine figures. Shown are.

DETAILED DESCRIPTION OF THE PREFERRED EMBODIMENTS

Figure 1:
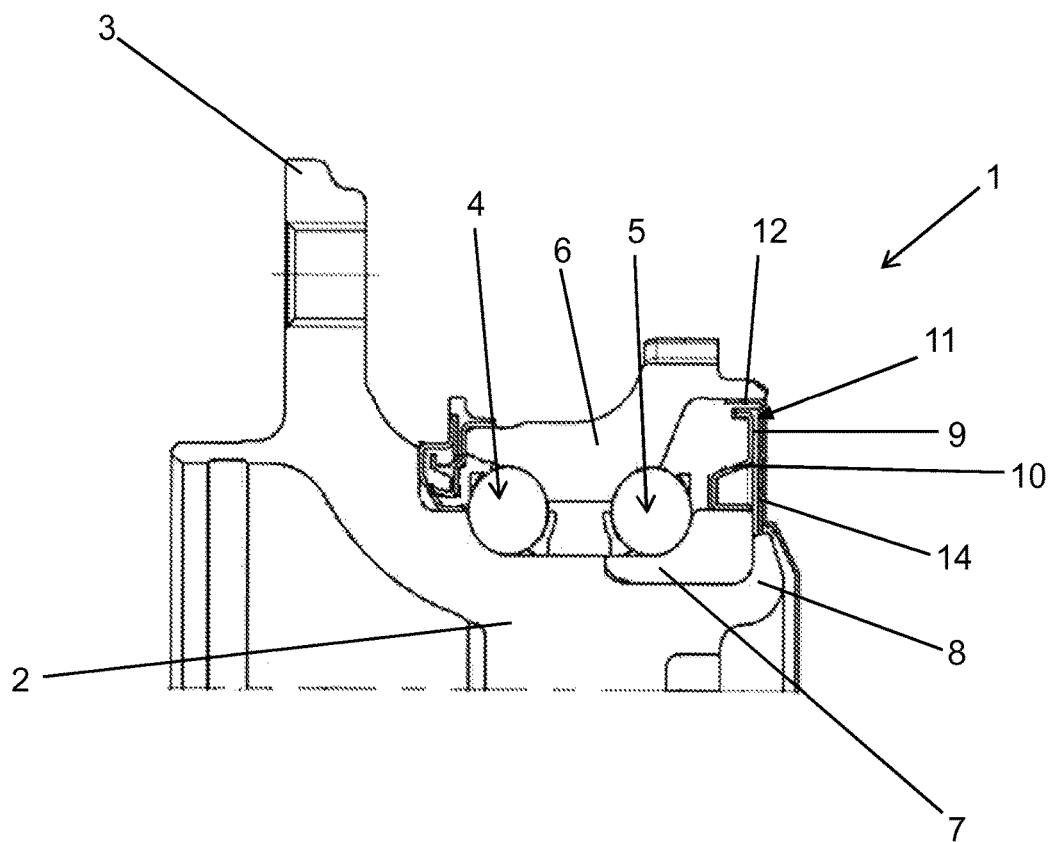
FIG. 1 a longitudinal section through a wheel bearing unit according to the invention, FIG. 2 an enlarged view of the protective cover of the wheel bearing unit according to the invention according to a first embodiment, FIG. 3 an enlarged view of the protective cover of the wheel bearing unit according to the invention according to a second embodiment, FIG. 4 an enlarged view of the protective cover of the wheel bearing unit according to the invention according to a third embodiment, FIG. 5 an enlarged view of the protective cover of the wheel bearing unit according to the invention according to a fourth embodiment, FIG. 6 an enlarged view of the protective cover of the wheel bearing unit according to the invention according to a fifth embodiment, FIG. 7 an enlarged view of the protective cover of the wheel bearing unit according to the invention according to a sixth embodiment, FIG. 8 an enlarged view of the protective cover of the wheel bearing unit according to the invention according to a seventh embodiment, FIG. 9 an enlarged view of the protective cover of the wheel bearing unit according to the invention according to an eighth embodiment.

FIG. 1 shows a wheel bearing unit 1 that is allocated to a not-shown vehicle wheel. The wheel bearing unit 1 comprises a wheel hub 2 that has, on its end, an integrally formed, radially directed wheel flange 3. Furthermore, the wheel bearing arrangement has two axially spaced rows of roller elements 4, 5 whose roller elements are guided on the outside in an outer ring 6. On the inside, the roller elements of the row of roller elements 4 are guided directly in a raceway of a wheel hub 2 and the roller elements of the row of roller elements 5 are guided in an inner ring 7 fixed on the wheel hub 2.

The inner ring 7 is fixed through the use of a rolling rivet connection 8 on the wheel hub 2 in the axial direction, wherein the row of roller elements 5 is pre-tensioned relative to the outer ring 6.

As can be further seen from FIG. 1, an encoder 9 is arranged on an outer periphery of the inner ring 7. The encoder 9 is provided on a carrier 10 by which the encoder 9 is connected to the outer periphery of the inner ring 7. The encoder 7 is formed of an elastomer material that is filled with magnetic particles and is connected integrally to the carrier 10 through vulcanization.

For sealing an opening between the outer ring 6 and the wheel hub 2 there is a protective cover 11 that is formed from a non-ferromagnetic material through molding. The protective cover 11 is pressed in with a cylindrical section 12 on the outer ring 6. A bottom section 14 extends inward in the radial direction from the cylindrical section 12 to cover an inner-side end of the wheel hub 2.

Figure 2:
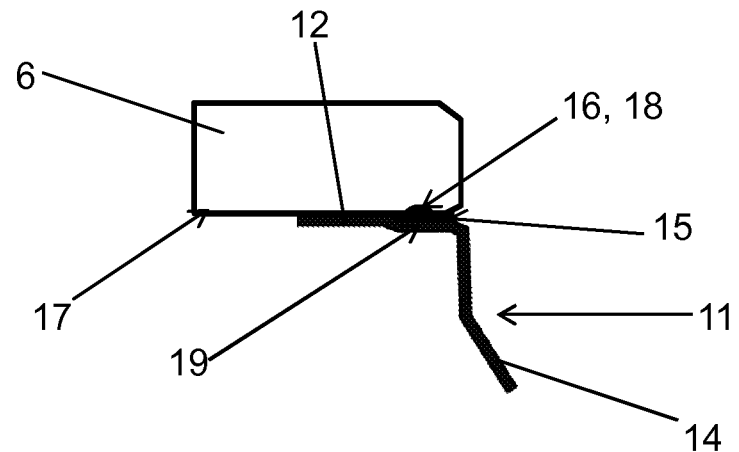

FIG. 2 shows an enlarged view of the protective cover 11 according to a first embodiment. The protective cover 11 is connected to the outer ring 6 with a substance bond. For this, a hardening fluid 15 is "injected" into a fill reservoir 16. This fill reservoir 16 is provided between the cylindrical section 12 and the outer ring 6. In this embodiment, the fill reservoir 16 is formed by a groove 18 on an inner periphery 17 of the outer ring 6. This groove 18 can be provided in some sections or all around. Furthermore, the cylindrical section 12 has, in the area of the fill reservoir 16, a radially sloping section 19 that transitions into the bottom section 14.

The FIGS. 3 to 9 show the protective cover 11 according to additional embodiments. Matching components are provided with identical reference symbols. The following description is therefore limited to the extent possible to features that are different.

Figure 3:
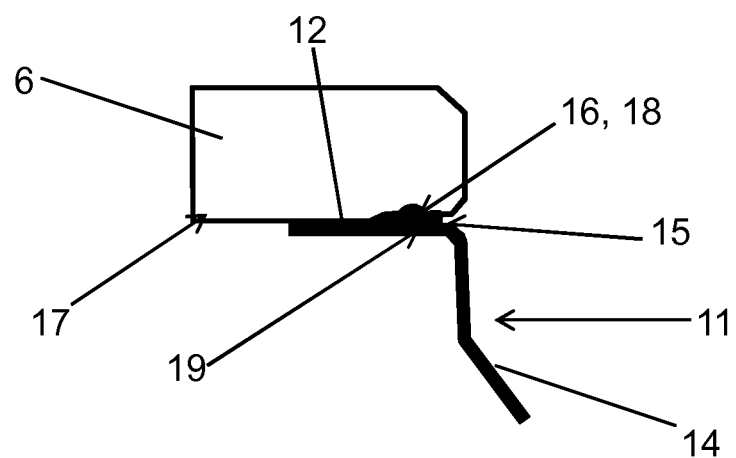

FIG. 3 shows the protective cover 11 according to a second embodiment. In this embodiment, the fill reservoir 16 is formed by a groove 18 on an inner periphery 17 of the outer ring 6. This groove 18 can be provided in some sections or all around. In contrast to FIG. 2, the cylindrical section 12 runs continuously in a straight line into the area of the bottom section 14.

Figure 4:
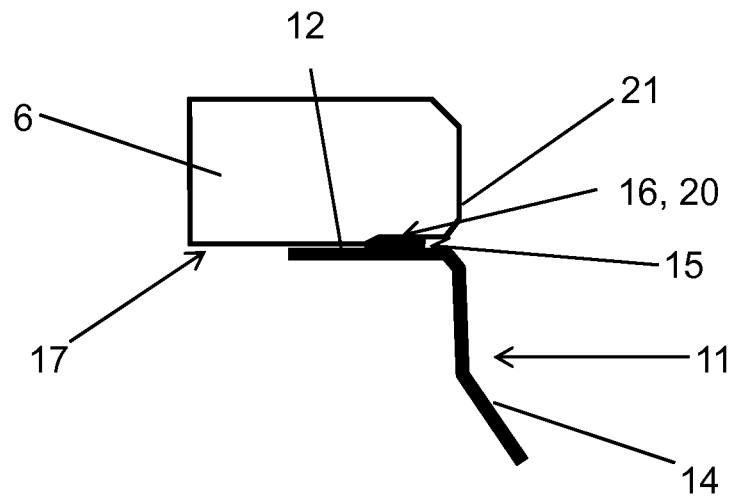

FIG. 4 shows the protective cover 11 according to a third embodiment. As can be seen from this figure, the fill reservoir 16 is formed as a recess 20 on the inner periphery 17 of the outer ring 6. The recess 20 extends from an outer side 21 of the outer ring 6 in the direction of the row of roller elements 4, 5.

Figure 5:
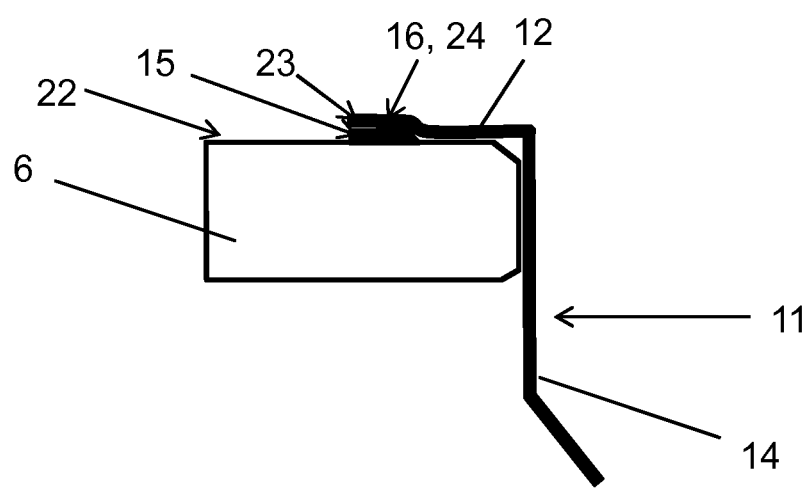

FIG. 5 shows a fourth embodiment of the protective cover 11. According to this embodiment, the protective cover 11 is pressed on an outer periphery 22 of the outer ring 6. The fill reservoir 16 is formed on the cylindrical section 12 of the protective cover 11. For forming the fill reservoir 16, the cylindrical section 12 has, in its end area 23, a section 24 offset to the outside in the radial direction.

Figure 6:
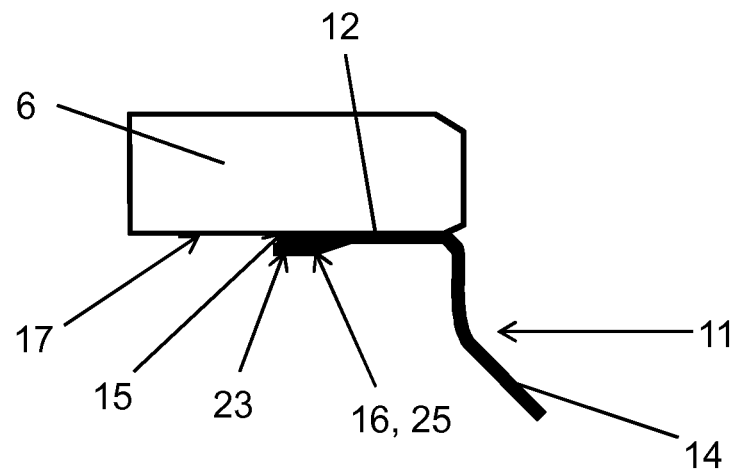

FIG. 6 shows a fifth embodiment of the protective cover. According to this embodiment, the protective cover 11 is pressed on the inner periphery 17 of the outer ring 6. The fill reservoir 16 is formed on the cylindrical section 12 of the protective cover 11. For forming the fill reservoir 16, the cylindrical section 12 has, in its end area 23, a section 25 offset to the inside in the radial direction.

Figure 7:
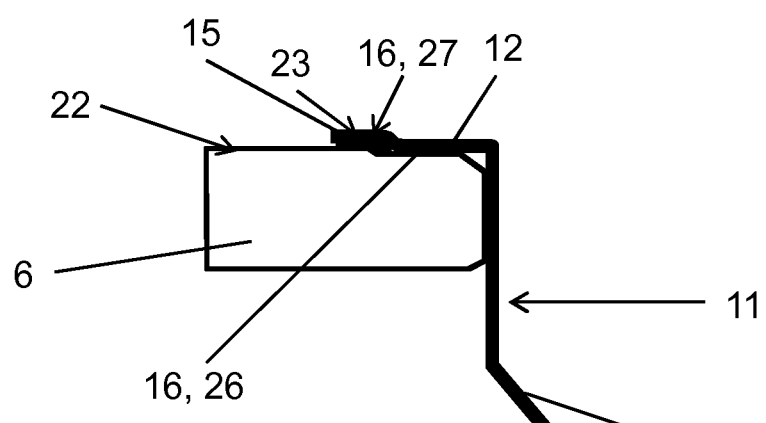

FIG. 7 shows the protective cover 11 according to a sixth embodiment. As can be seen from this figure, the fill reservoir 16 is formed both on the outer periphery 22 and also on the cylindrical section 12. The fill reservoir 16 is formed as a recess 26 on the inner periphery 17 of the outer ring 6. In addition, the cylindrical section 12 has, in its end area 23, a section 27 offset to the outside in the radial direction.

Figure 8:
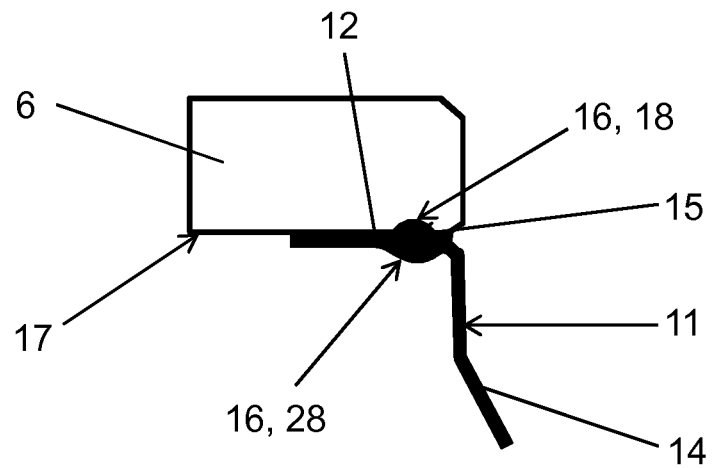

FIG. 8 shows a seventh embodiment of the protective cover 11. In this embodiment, the fill reservoir 16 is formed both on the inner periphery 17 and also on the cylindrical section 12. On the inner periphery 17 of the outer ring 6, the fill reservoir 16 is formed by means of a groove 18. This groove 18 can be provided in some sections or all around. The cylindrical section 12, in the area of the groove 18, a bead 28 that forms the fill reservoir 16.

Figure 9:
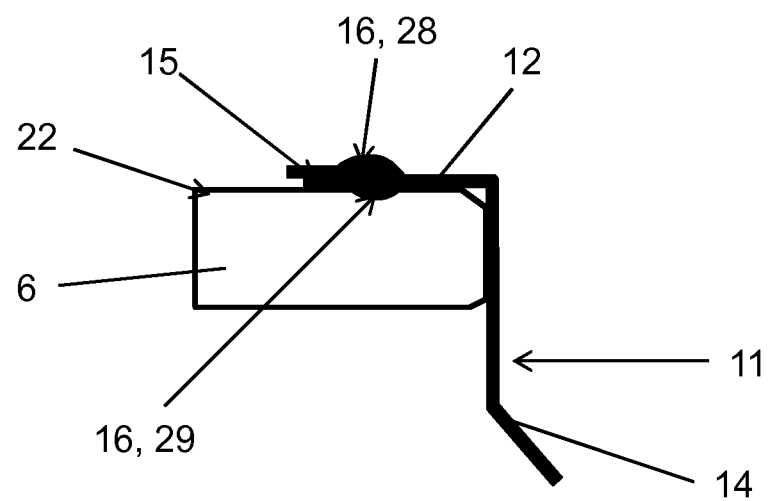

FIG. 9 shows another embodiment of the protective cover 11. The basic configuration is the same as the configuration described in FIG. 8. In contrast to FIG. 8, the protective cover is pressed on the outer periphery 22, wherein the groove 29 is provided on the outer periphery.

LIST OF REFERENCE NUMBERS

1 Wheel bearing unit
2 Wheel hub
3 Wheel flange
4 Row of roller elements
5 Row of roller elements
6 Outer ring
7 Inner ring
8 Rolling rivet connection
9 Encoder
10 Carrier
11 Protective cover
12 Cylindrical section
14 Bottom section
15 Fluid
16 Fill reservoir
17 Inner periphery
18 Groove
19 Radially sloping section
20 Recess
21 Outer side of the outer ring 22 Outer periphery
23 End area
24 Stepped section
25 Stepped section
26 Recess
27 Stepped section
28 Bead
29 Groove

The invention claimed is:

1. A wheel bearing unit comprising a wheel hub having on one end an integrally formed wheel flange, an inner ring that rotates together with the wheel hub, the inner ring is fastened on the wheel hub with a rolling rivet connection in order to pre-tension a row of roller elements relative to an outer ring, an encoder on the inner ring that extends radially in a direction of the outer ring, a protective cover is fixed on the outer ring in order to close and seal ring-shaped openings that are formed between the outer ring and the wheel hub, the protective cover is pressed in with a cylindrical section and has a bottom section that extends inward from the cylindrical section in a radial direction in order to cover an inner end of the wheel hub, the cylindrical section is connected to the outer ring with a substance bond connection by injection of a hardening fluid in a reservoir that is provided between the cylindrical section and the outer ring, the reservoir is axially spaced away from both axial ends of the cylindrical section, and the hardening fluid hardens to form a fixed connection between the outer ring and the cylindrical section.

2. The wheel bearing unit according to claim 1, wherein the reservoir is formed on the outer ring by a gap.

3. The wheel bearing unit according to claim 1, wherein the reservoir is formed on the cylindrical section of the protective cover by a bead.

4. The wheel bearing unit according to claim 1, wherein the protective cover is pressed in with the cylindrical section on an inner periphery of the outer ring.

5. The wheel bearing unit according to claim 1, wherein the protective cover is pressed in with the cylindrical section on an outer periphery of the outer ring.

6. The wheel bearing unit according to claim 1, wherein the protective cover is formed from a non-ferromagnetic material.

7. The wheel bearing unit according to claim 1, wherein the protective cover has a shell-shaped form and is formed by molding.

8. The wheel bearing unit according to claim 1, wherein a rotational speed sensor is provided for detecting a rotational speed of the wheel hub, and the rotational speed sensor and the encoder are arranged with a predetermined air gap in an axial direction opposite each other over the bottom section.

9. The wheel bearing unit according to claim 1, wherein the hardening fluid is a hardening fluid configured to harden via exposure to UV light.

10. The wheel bearing unit according to claim 1, wherein (1) the outer ring defines a first flat planar surface on a radially inner surface, (2) the protective cover defines a second flat planar surface on a radially outer surface, and
the first flat planar surface and the second flat planar surface contact each other axially inward from the reservoir.

* * * * *